(12) United States Patent
Kanai et al.

(10) Patent No.: US 9,221,350 B2
(45) Date of Patent: Dec. 29, 2015

(54) CONTROL DEVICE FOR VEHICLE

(75) Inventors: Osamu Kanai, Toyota (JP); Takahiko Tsutsumi, Toyota (JP); Ichiro Kitaori, Nagoya (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 650 days.

(21) Appl. No.: 13/054,892

(22) PCT Filed: Jan. 9, 2009

(86) PCT No.: PCT/JP2009/050179
§ 371 (c)(1),
(2), (4) Date: Jan. 19, 2011

(87) PCT Pub. No.: WO2010/079606
PCT Pub. Date: Jul. 15, 2010

(65) Prior Publication Data
US 2011/0130910 A1    Jun. 2, 2011

(51) Int. Cl.
*B60L 9/00* (2006.01)
*G05D 1/00* (2006.01)
*G06F 7/00* (2006.01)
*B60L 11/18* (2006.01)
*B60L 3/12* (2006.01)
*B60L 11/14* (2006.01)

(52) U.S. Cl.
CPC ............... *B60L 11/1816* (2013.01); *B60L 3/12* (2013.01); *B60L 11/14* (2013.01); *B60L 11/1824* (2013.01); *B60L 2210/20* (2013.01); *B60L 2220/18* (2013.01); *B60L 2250/24* (2013.01); *Y02T 10/70* (2013.01); *Y02T 10/7005* (2013.01); *Y02T 10/7077* (2013.01); *Y02T 10/725* (2013.01); *Y02T 90/121* (2013.01); *Y02T 90/127* (2013.01); *Y02T 90/14* (2013.01)

(58) Field of Classification Search
USPC .............................. 74/473.23, 473.31, 473.12
See application file for complete search history.

(56) References Cited

U.S. PATENT DOCUMENTS

| | | | | |
|---|---|---|---|---|
| 6,151,977 A | * | 11/2000 | Menig et al. | ................. 74/336 R |
| 6,487,927 B1 | * | 12/2002 | Sputhe | ........................ 74/473.23 |
| 7,094,177 B2 | * | 8/2006 | Inoue et al. | ..................... 477/34 |
| 7,563,197 B2 | * | 7/2009 | Ayabe et al. | .................. 477/121 |
| 7,628,236 B1 | * | 12/2009 | Brown | ........................ 180/65.21 |
| 7,740,559 B2 | * | 6/2010 | Ayabe et al. | .................. 477/102 |

(Continued)

FOREIGN PATENT DOCUMENTS

| | | |
|---|---|---|
| JP | 2-018141 A | 1/1990 |
| JP | 09-322313 A | 12/1997 |

(Continued)

OTHER PUBLICATIONS

Translation of JP 2008-284952, Kimihiro et al, Nov. 27, 2008.*

*Primary Examiner* — Bhavesh V Amin
(74) *Attorney, Agent, or Firm* — Sughrue Mion, PLLC

(57) ABSTRACT

When a charge connector has been removed from a vehicle-side connector while parking lock is set, an ECU determines whether or not there is return history that a momentary shift lever has moved to a home position after removal of the charge connector from the vehicle-side connector. When there is return history and when a brake-on state is set, the shift lever has been operated from the home position to any position of N, D and R, and the resultant position is continuously maintained for a prescribed period of time, the ECU unlocks the parking lock.

6 Claims, 3 Drawing Sheets

(56) References Cited

U.S. PATENT DOCUMENTS

| | | | |
|---|---|---|---|
| 8,423,232 B2* | 4/2013 | Tsutsumi et al. | 701/29.7 |
| 2002/0152827 A1* | 10/2002 | Hayashi et al. | 74/473.3 |
| 2002/0162699 A1* | 11/2002 | Shiomi et al. | 180/315 |
| 2004/0178050 A1* | 9/2004 | Wylde | 200/61.88 |
| 2007/0093358 A1* | 4/2007 | Ayabe et al. | 477/97 |
| 2007/0117676 A1* | 5/2007 | Ayabe et al. | 477/34 |
| 2007/0117677 A1* | 5/2007 | Ayabe et al. | 477/115 |
| 2009/0240387 A1* | 9/2009 | Kawai et al. | 701/22 |
| 2010/0320964 A1* | 12/2010 | Lathrop et al. | 320/109 |
| 2011/0098881 A1* | 4/2011 | Tsutsumi et al. | 701/34 |
| 2011/0202231 A1* | 8/2011 | Ueno et al. | 701/34 |
| 2012/0016559 A1* | 1/2012 | Ueno et al. | 701/55 |
| 2012/0305360 A1* | 12/2012 | Kitaori et al. | 192/219.4 |

FOREIGN PATENT DOCUMENTS

| | | |
|---|---|---|
| JP | 2000-115901 A | 4/2000 |
| JP | 2008-051255 A | 3/2008 |
| JP | 2008-284952 A | 11/2008 |

* cited by examiner

CONTROL DEVICE FOR VEHICLE

TECHNICAL FIELD

The present invention relates to control of a vehicle capable of running with electric power supplied from a power supply provided outside the vehicle.

BACKGROUND ART

Development of a hybrid vehicle or an electric car capable of running with electric power supplied from a power supply outside the vehicle has attracted attention in recent years. Such a vehicle is also called a plug-in vehicle, and it aims to improve fuel efficiency, to suppress exhaust gas and to improve user's convenience by storing as much electric power as possible from the power supply outside the vehicle and running with the stored electric power. A technique relating to control of charging of such a vehicle is disclosed, for example, in Japanese Patent Laying-Open No. 9-322313 (Patent Document 1) and Japanese Patent Laying-Open No. 2000-115901 (Patent Document 2).

In addition, a system in which a position of a momentary shift lever operated by a user is detected and a control state of a transmission mechanism is changed in accordance with a detected lever position under electrical control (a shift-by-wire system) is disclosed, for example, in Japanese Patent Laying-Open No. 2008-51255 (Patent Document 3).

Patent Document 1: Japanese Patent Laying-Open No. 9-322313
Patent Document 2: Japanese Patent Laying-Open No. 2000-115901
Patent Document 3: Japanese Patent Laying-Open No. 2008-51255

DISCLOSURE OF THE INVENTION

Problems to be Solved by the Invention

In the plug-in vehicle, charging is carried out by connecting a charge connector connected to the power supply outside the vehicle to the vehicle. Therefore, normally, while the charge connector is connected to the vehicle (during charging), unlocking of a parking lock is prohibited, and after the charge connector is removed from the vehicle, the parking lock is unlocked in accordance with a position of the shift lever.

If a momentary shift lever as described above is adopted as the shift lever and if a shopping bag or the like is hung from the shift lever, the shift lever does not return to a home position but it may be held, for example, at a drive position (a D position). If the parking lock is unlocked in accordance with the position of the shift lever even in such a case, the parking lock is disadvantageously unlocked at the time point of removal of the charge connector from the vehicle by the user. None of Patent Documents 1 to 3 described above, however, points out or suggests such a problem, or mentions a technique for solving such a problem.

The present invention was made to solve the above-described problems, and an object of the present invention is to provide a control device and a control method for a vehicle capable of preventing unlocking of a parking lock unintended by a user in a plug-in vehicle having a momentary shift lever.

Means for Solving the Problems

A control device according to the present invention controls a vehicle capable of running with electric power supplied from an external power supply outside the vehicle. The vehicle includes a momentary movable portion for transmission control that is moved to any position among a plurality of shift positions when it is operated by a user and returns to a predetermined home position when it is not operated by the user, a connector to which the external power supply is connected, and a change device changed to any of a parking lock state in which an axle shaft of the vehicle is locked and a non-parking lock state in which the axle shaft of the vehicle is not locked. The control device includes a detection unit for detecting a position of the movable portion and a control unit for controlling the change device. The control unit determines, when the external power supply is disconnected from the connector while the change device is in the parking lock state, whether or not the movable portion has been operated after disconnection of the external power supply from the connector, prohibits unlock processing in which the parking lock state is canceled based on the position of the movable portion when the movable portion has not been operated, and permits the unlock processing when the movable portion has been operated.

Preferably, the control unit determines, when the external power supply is disconnected from the connector while the change device is in the parking lock state, whether or not the movable portion has been operated from the home position to a prescribed shift position different from the home position after disconnection of the external power supply from the connector, and permits the unlock processing when the movable portion has been operated from the home position to the prescribed shift position.

Further preferably, the control unit determines, when the external power supply is disconnected from the connector while the change device is in the parking lock state, whether or not there is return history indicating detection of the fact that the position of the movable portion has returned to the home position after disconnection of the external power supply from the connector, prohibits the unlock processing when there is no return history, and permits the unlock processing when there is return history and when the movable portion has been operated from the home position to the prescribed shift position.

Further preferably, the control unit has the return history stored when it is detected that the position of the movable portion has returned to the home position while the external power supply is not connected to the connector, erases the return history when the external power supply is connected to the connector, prohibits the unlock processing when the external power supply is disconnected from the connector while the change device is in the parking lock state and when the return history is not stored, and permits the unlock processing when the return history is stored and when the movable portion has been operated from the home position to the prescribed shift position.

Further preferably, the control unit permits charging from the external power supply and prohibits canceling of the parking lock state while the external power supply is connected to the connector and the change device is in the parking lock state.

Further preferably, the plurality of shift positions include a forward drive position in addition to the home position. The forward drive position is provided at a position lower than the home position.

Effects of the Invention

According to the present invention, unlocking of a parking lock unintended by a user can be prevented in a plug-in vehicle having a momentary shift lever.

Figure 1:
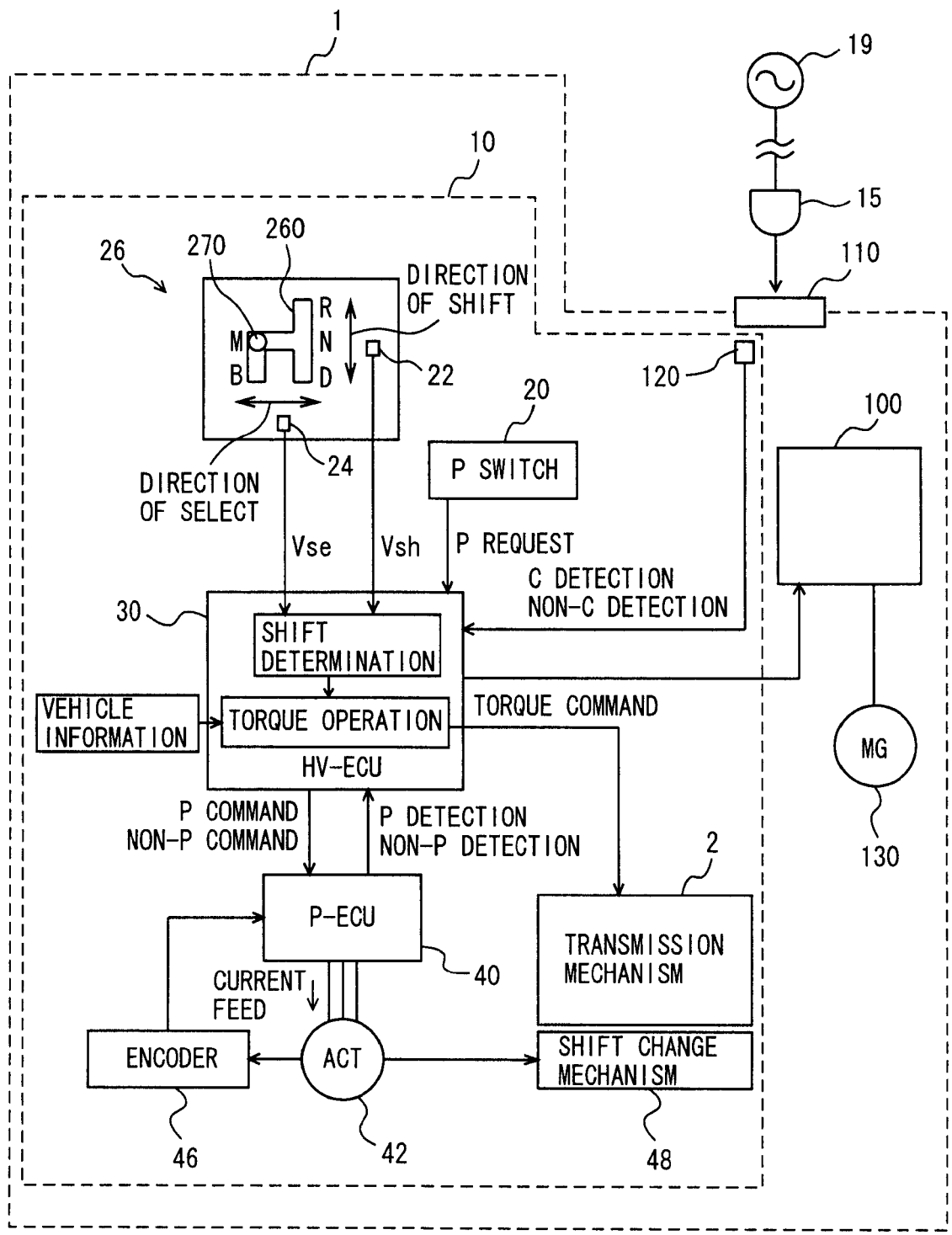
FIG. 1 is a diagram showing a configuration of a vehicle including a control device according to the present embodiment.

DESCRIPTION OF THE REFERENCE SIGNS 1 vehicle; 2 transmission mechanism; 10 shift control system; 15 charge connector; 19 AC power supply; 20 P switch; 22 shift sensor; 24 select sensor; 26 shift lever mechanism; 30 HV-ECU; 40 P-ECU; 42 actuator; 46 encoder; 48 shift change mechanism; 100 power supply system; 110 vehicle-side connector; 120 connection detection sensor; 130 motor-generator for running; 260 shift gate; 270 shift lever; 310 A/D converter; 320 operation processing unit; 321 position detection unit; 322 range determination unit; 323 connection determination unit; 324 return determination unit; 235 unlock command unit; and 330 storage unit.

BEST MODES FOR CARRYING OUT THE INVENTION

An embodiment of the present invention will be described hereinafter with reference to the drawings. In the description below, the same elements have the same reference characters allotted and their label and function are also identical. Therefore, detailed description thereof will not be repeated.

FIG. 1 shows a configuration of a vehicle 1 including a control device according to the present embodiment. Vehicle 1 incorporates a shift control system 10 and a power supply system 100. Vehicle 1 is a vehicle in which a power storage device in power supply system 100 can be charged by an AC power supply 19 provided outside vehicle 1 (hereinafter also referred to as a "plug-in vehicle"). In addition, vehicle 1 is a hybrid vehicle that runs with at least any of motive power of an engine (not shown) and motive power of a motor-generator 130 for running driven by electric power from power supply system 100. It is noted that a vehicle to which the control device according to the present invention is applicable is not limited to a hybrid vehicle so long as it is a plug-in vehicle, and it may be applicable, for example, to an electric car.

Shift control system 10 functions as a shift-by-wire system in which a control state of a transmission mechanism 2 (hereinafter also referred to as a "shift range") is changed under electrical control. Shift control system 10 includes a P switch 20, a shift lever mechanism 26, a hybrid control device (hereinafter also referred to as an "HV-ECU (Electronic Control Unit)") 30, a parking control device (hereinafter also referred to as a "P-ECU") 40, an actuator 42, an encoder 46, and a shift change mechanism 48. It is noted that shift control system 10 is started up when a not-shown start switch is turned on by the user and it is stopped when the start switch is turned off.

P switch 20 is a switch for switching a shift range between a parking range (hereinafter also referred to as a "P range") in which a vehicle stop state is maintained and a range other than parking (hereinafter also referred to as a "non-P range"). The user inputs a request for switching the shift range to the P range by operating P switch 20. P switch 20 may be implemented by a momentary switch. When the user inputs the request for switching the shift range to the P range, P switch 20 transmits a signal indicating a request for switch to the P range (a P request signal) to HV-ECU 30.

Shift lever mechanism 26 is constituted of a shift gate 260, a shift lever 270, a shift sensor 22, and a select sensor 24.

Shift lever 270 is a momentary shift lever that is maintained at a home position (hereinafter also denoted as an "M position") when not operated by the user and moved along a path formed in shift gate 260 when operated by the user. As a structure and an operation of the momentary shift lever are well-known techniques, detailed description thereof is not provided.

In shift gate 260, in addition to the M position described above, positions corresponding to such shift positions as a forward drive position (hereinafter referred to as a "D position"), a rearward drive position (hereinafter referred to as an "R position"), a neutral position (hereinafter referred to as an "N position"), and a brake position (hereinafter referred to as a "B position") are set in advance.

As shown in FIG. 1, the B position is provided under the M position, and the N position is provided on the right of the M position. The D position is provided under the N position, and the R position is provided above the N position.

Shift sensor 22 detects a shift voltage value Vsh in accordance with a position in a direction of shift (see FIG. 1) of shift lever 270 and outputs a result of detection to HV-ECU 30. Select sensor 24 detects a select voltage value Vse in accordance with a position in a direction of select (see FIG. 1) of shift lever 270 and outputs a result of detection to HV-ECU 30.

HV-ECU 30 manages an operation of shift control system 10 in a centralized manner, based on outputs from P switch 20, shift sensor 22 and select sensor 24.

HV-ECU 30 detects a position of shift lever 270 in shift gate 260 (hereinafter also referred to as a "shift position SP") based on shift voltage value Vsh from shift sensor 22 and select voltage value Vse from select sensor 24. This shift position SP is the shift position requested by the user.

HV-ECU 30 determines whether detected shift position SP has been maintained at the same position for a time period longer than a predetermined position recognition time period or not. When shift position SP has been maintained at the same position for a time period longer than the position recognition time period, HV-ECU 30 recognizes the maintained position as shift position SP.

When any position of D, N, R, and B is recognized as shift position SP, HV-ECU 30 operates requested torque based on vehicle information (such as an accelerator position) and transmits a torque command in accordance with recognized shift position SP and the requested torque to transmission mechanism 2. Thus, the shift range of transmission mechanism 2 is changed to a range (any of a D range, an N range, an R range, and a B range) corresponding to recognized shift position SP. It is noted that the vehicle moves forward when the D range is set and the vehicle moves rearward when the R range is set. In addition, when the N range is set, transmission of motive power by transmission mechanism 2 is cut off.

In addition, HV-ECU 30 transmits any of a signal indicating parking lock (a P command signal) and a signal indicating unlocking of parking lock (a non-P command signal) to P-ECU 40.

P-ECU 40 is connected to HV-ECU 30 so that they can communicate with each other. Receiving the P command signal or the non-P command signal from HV-ECU 30, P-ECU 40 controls an operation of actuator 42 for driving shift change mechanism 48 for changing the shift range between the P range and the non-P range.

Actuator 42 is implemented by a switched reluctance motor (hereinafter denoted as an "SR motor") and it drives shift change mechanism 48 in response to a control signal from P-ECU 40. When actuator 42 receives the P command signal from P-ECU 40, actuator 42 drives shift change mechanism 48 so as to set a parking lock state (a state in which an axle shaft is locked). When actuator 42 receives the non-P command signal from P-ECU 40, actuator 42 drives shift change mechanism 48 so as to cancel the parking lock state. In the present invention, actuator 42 is described as being implemented by a motor, however, it may be implemented by a hydraulic pressure.

Encoder 46 rotates together with actuator 42 and detects a status of rotation of the SR motor. Encoder 46 in the present embodiment is a rotary encoder for outputting a signal of an A phase, a B phase and a Z phase.

P-ECU 40 obtains a signal output from encoder 46 and grasps the status of rotation of the SR motor, controls current feed for driving the SR motor, and transmits any of a signal indicating that the current shift range is set to the P range (a P detection signal) and a signal indicating that the current shift range is set to the non-P range (a non-P detection signal) to HV-ECU 30.

In addition, vehicle 1 includes power supply system 100, a vehicle-side connector 110, and a connection detection sensor 120.

Power supply system 100 converts AC power from AC power supply 19 supplied through vehicle-side connector 110 to DC power and has the DC power stored in a power storage device therein, and supplies and receives electric power to/from motor-generator 130 for running Charging and discharging of power supply system 100 is controlled by a control signal from HV-ECU 30.

Vehicle-side connector 110 is structured such that a charge connector 15 connected to AC power supply 19 can be connected. Connection detection sensor 120 detects whether charge connector 15 is connected to vehicle-side connector 110 or not. When the connectors are connected to each other, connection detection sensor 120 transmits a C detection signal to HV-ECU 30, and otherwise transmits a non-C detection signal thereto.

When the M position is recognized as shift position SP and HV-ECU 30 receives the P request signal from P switch 20 while the vehicle is stopped, HV-ECU 30 transmits the P command signal to P-ECU 40. The shift range is thus controlled to the P range.

Then, when HV-ECU 30 receives the C detection signal from connection detection sensor 120, HV-ECU 30 permits charging of power supply system 100 by AC power supply 19 on condition that the P detection signal is received from P-ECU 40 (that is, the shift range is set to the P range), and starts charging of power supply system 100 by AC power supply 19 after a prescribed condition is satisfied. Namely, charging of power supply system 100 by AC power supply 19 is permitted only when the P range (parking lock state) is set and the vehicle is stopped.

When charging of power supply system 100 by AC power supply 19 is started, HV-ECU 30 prohibits control of the shift range based on the operation of shift lever 270 and maintains the shift range in the P range as long as reception of the C detection signal continues. Then, when HV-ECU 30 receives the non-C detection signal from connection detection sensor 120 (that is, when charge connector 15 is removed from vehicle-side connector 110), HV-ECU 30 resumes control of the shift range based on the operation of shift lever 270.

The following problem may arise if control of the shift range based on the operation of shift lever 270 is simply resumed at the time point of removal of charge connector 15 by the user.

Specifically, usually at the time point of removal of charge connector 15 by the user, shift lever 270 is located at the M position which is the home position. Therefore, unless the user subsequently operates shift lever 270 from the M position to any position of D, N and R, the P range will not be reset. On the other hand, if a shopping bag or the like is hung from shift lever 270 at the time point of removal of charge connector 15 by the user, shift lever 270 may be maintained at the D position without returning to the M position, due to the weight of the shopping bag. In such a case, shift position SP may be set to the D position and the P range may be reset despite the fact that the user did not operate shift lever 270.

In order to solve this problem, the present invention is characterized in that resetting of the P range is permitted only when the user operates shift lever 270 from the M position to any position of D, N and R subsequent to the user's operation to remove charge connector 15 while the vehicle is stopped with the P range being set.

Figure 2:
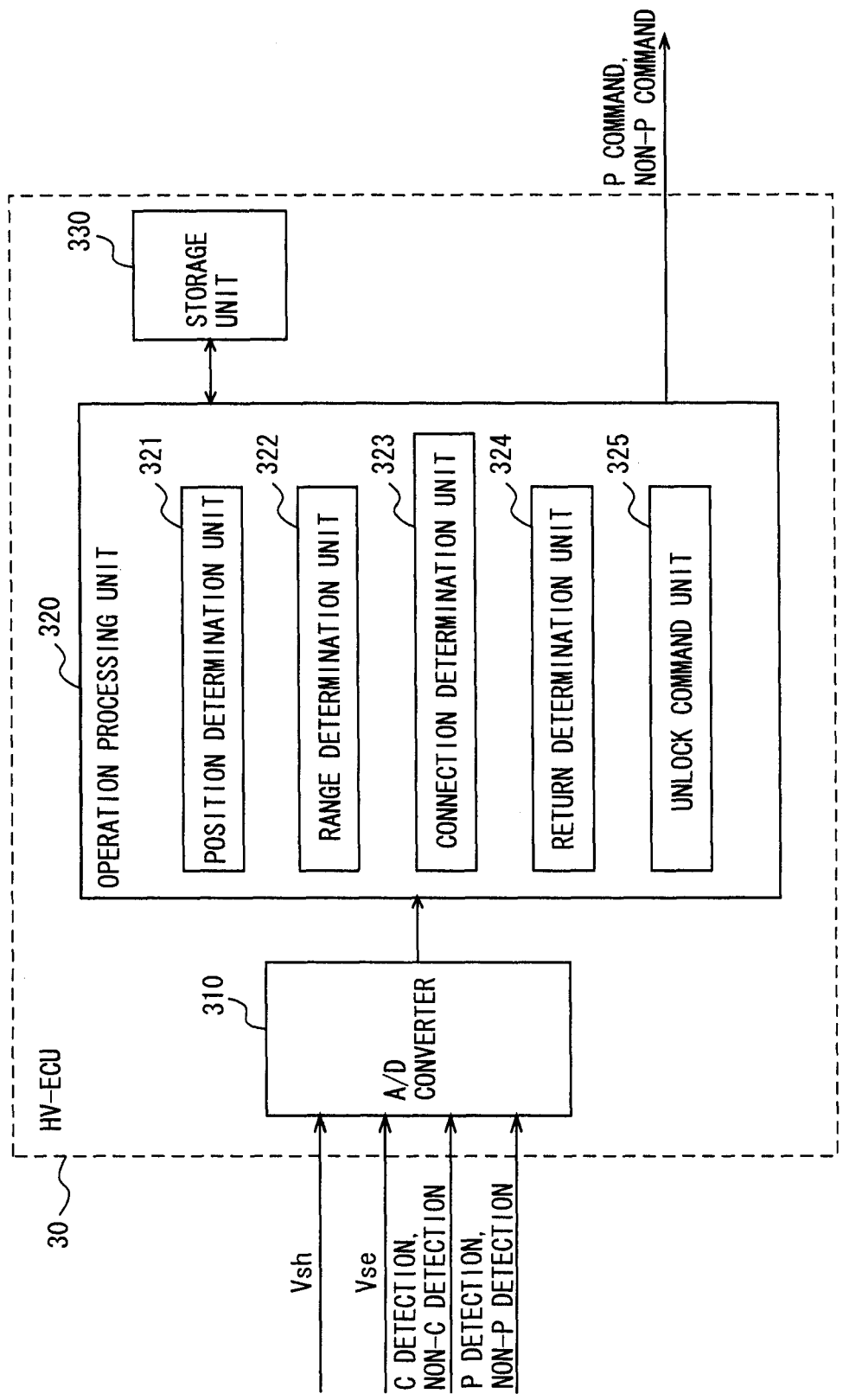
FIG. 2 is a functional block diagram of an ECU.

FIG. 2 shows a functional block diagram when HV-ECU 30 according to the present embodiment performs processing for resetting the P range. HV-ECU 30 includes an A/D converter 310, an operation processing unit 320 and a storage unit 330.

A/D converter 310 receives shift voltage value Vsh from shift sensor 22, select voltage value Vse from select sensor 24, the C detection signal and the non-C detection signal from connection detection sensor 120, and the P detection signal and the non-P detection signal from P-ECU 40, converts a voltage value detected by each sensor (an analog value) to a digital value (hereinafter also denoted as an "A/D value") and transmits the digital value to operation processing unit 320.

Storage unit 330 stores various types of information, a program, a threshold value, a map, and the like, and data is read to operation processing unit 320 or data from operation processing unit 320 is stored therein as necessary. It is noted that the information stored in storage unit 330 includes also the history of shift position SP.

Operation processing unit 320 includes a position detection unit 321, a range determination unit 322, a connection determination unit 323, a return determination unit 324, and an unlock command unit 325.

Position detection unit 321 detects shift position SP based on shift voltage value Vsh and select voltage value Vse. Detected shift position SP is stored in storage unit 330.

Range determination unit 322 determines whether the current shift range is set to the P range or not, based on the P detection signal and the non-P detection signal from P-ECU 40.

Connection determination unit 323 determines a state of connection between charge connector 15 and vehicle-side connector 110 based on the C detection signal and the non-C detection signal from connection detection sensor 120.

When connection determination unit 323 determines that charge connector 15 has been removed from vehicle-side connector 110, return determination unit 324 makes return determination for determining whether shift position SP has subsequently returned to the M position or not. When return determination unit 324 determines that shift position SP has returned to the M position, that history is stored in storage unit 330 as return history. This return history is cleared at the time point when connection determination unit 323 determines that charge connector 15 is connected to vehicle-side connector 110. It is noted that return determination by return determination unit 324 and storage of the return history is not carried out while charge connector 15 is connected to vehicle-side connector 110.

When the return history has been stored in storage unit 330, unlock command unit 325 transmits a non-P command signal (a signal indicating unlocking of parking lock) to P-ECU 40 on condition that a prescribed condition is satisfied. The prescribed condition is such a condition that the user is pressing down a brake pedal (a brake-on state), shift position SP has changed from the M position to any position of N, D and R, and the resultant position is continuously maintained for a prescribed period of time.

It is noted that the function described above may be attained by software or by hardware.

Figure 3:
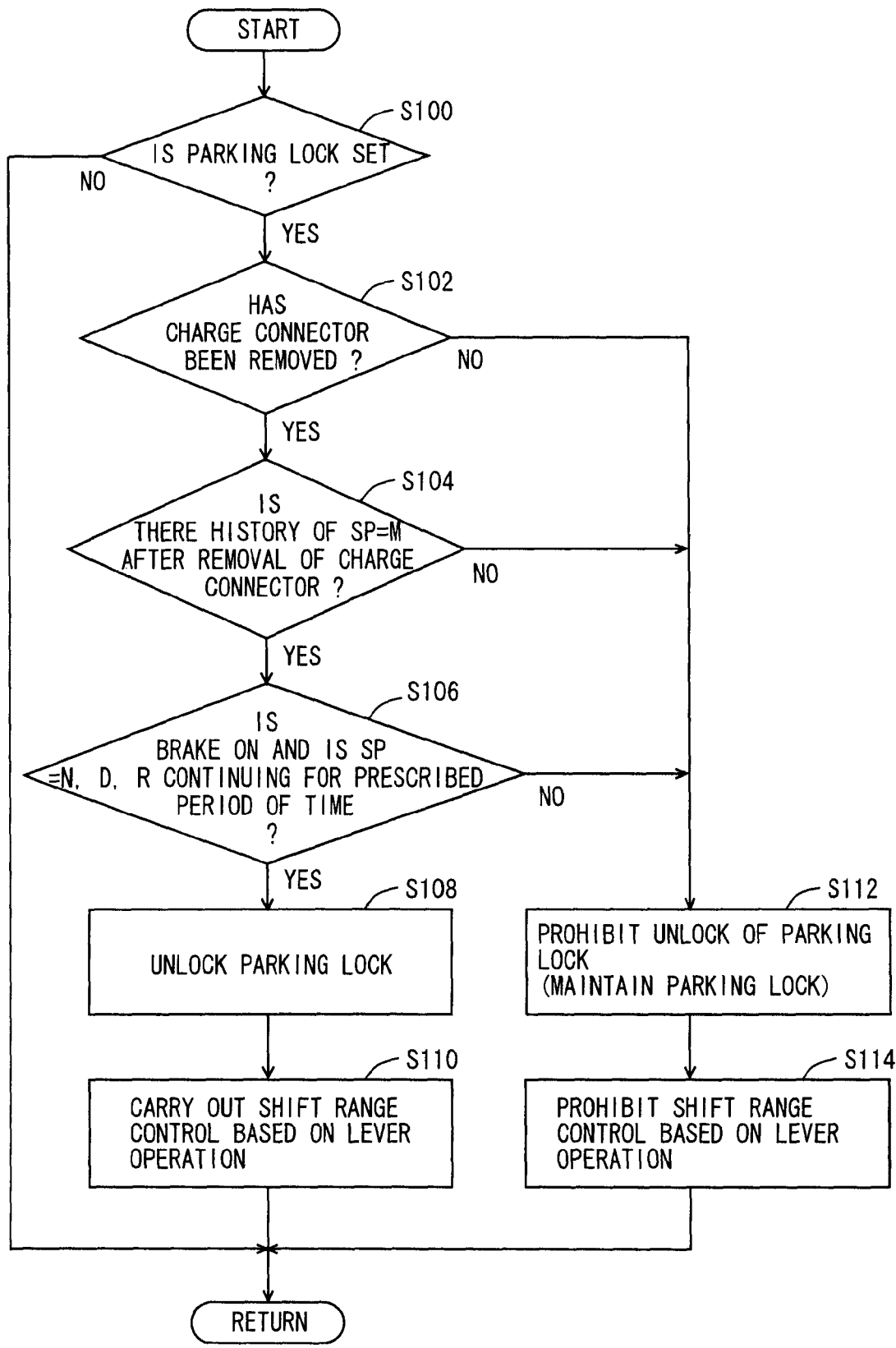
FIG. 3 is a flowchart showing a control structure of the ECU.

FIG. 3 shows a flow of a process performed by HV-ECU 30 when the function described above is attained by the software. It is noted that the process is repeated in a predetermined cycle time.

As shown in FIG. 3, in S100, HV-ECU 30 determines whether parking lock is set or not (whether the current shift range is set to the P range or not). When affirmative determination is made in this processing (YES in S100), the process proceeds to S102. Otherwise (NO in S100), this process ends.

In S102, HV-ECU 30 determines whether charge connector 15 has been removed from vehicle-side connector 110 or not. When affirmative determination is made in this processing (YES in S102), the process proceeds to S104. Otherwise (NO in S102), the process proceeds to S112.

In S104, HV-ECU 30 determines whether there is history that shift position SP has been set to the M position after removal of charge connector 15 from vehicle-side connector 110. This determination is made based on whether storage unit 330 stores the return history described above or not. When affirmative determination is made in this processing (YES in S104), the process proceeds to S106. Otherwise (NO in S104), the process proceeds to S112.

In S106, HV-ECU 30 determines whether or not the brake-on state is set, whether or not shift position SP has changed from the M position to any position of N, D and R, and whether or not the resultant position has continuously been maintained for a prescribed period of time. This prescribed period of time has a value not greater than a position recognition time period in performing processing for recognizing shift position SP. When affirmative determination is made in this processing (YES in S106), the process proceeds to S108. Otherwise (NO in S106), the process proceeds to S112.

In S108, HV-ECU 30 unlocks parking lock. Namely, HV-ECU 30 transmits the non-P command signal to P-ECU 40. In S110, HV-ECU 30 permits shift control based on the operation of shift lever 270.

In S112, HV-ECU 30 prohibits unlocking of parking lock and maintains parking lock. Namely, HV-ECU 30 prohibits transmission of the non-P command signal to P-ECU 40. In S114, HV-ECU 30 prohibits shift control based on the operation of shift lever 270.

An operation of HV-ECU 30 representing the control device according to the present embodiment based on the structure and the flowchart as above will be described.

It is assumed that shift lever 270 is maintained at the D position due to the weight of a shopping bag or the like during charging of power supply system 100 by AC power supply 19 while the vehicle is stopped with the P range being set. Here, when charging is completed and the user subsequently removes charge connector 15 from vehicle-side connector 110 (YES in S102), shift lever 270 is maintained at the D position and there is no history that shift position SP has been set to the M position after removal of charge connector 15 (NO in S104). Therefore, parking lock is still maintained (S112). Accordingly, parking lock is not unlocked at the time point when the user removes charge connector 15 from vehicle-side connector 110 (that is, at the time point when the user does not intend to unlock parking lock).

Subsequently, at the time point when the user performs such an operation as removing a shopping bag or the like from shift lever 270 and shift position SP returns to the M position (YES in S104), when the user further operates shift lever 270 from the M position to any position of N, D and R while he/she is pressing down the brake pedal, and when the resultant position is maintained for a prescribed period of time (YES in S106), parking lock is unlocked (S108).

As described above, according to the control device of the present embodiment, when charging is completed and the user removes the charge connector from the vehicle-side connector while the vehicle is stopped with the P range being set but when the shift lever does not return to the M position after removal of the charge connector from the vehicle-side connector, parking lock is maintained without the parking lock being unlocked. Therefore, for example, even when a shopping bag or the like is hung from the shift lever to cause the shift lever to be maintained at any position of D, N and R, unlocking of the parking lock contrary to the user's intention can be prevented.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

The invention claimed is:

1. A control device for a vehicle capable of running with electric power supplied from an external power supply outside the vehicle, said vehicle including a momentary movable portion for transmission control that is moved to any position among a plurality of shift positions when it is operated by a user and returns to a predetermined home position when it is not operated by the user, and a connector to which said external power supply is connected, comprising:
   a processor for locking an axle shaft of said vehicle to achieve a parking lock state and unlocking the axle shaft of said vehicle to achieve a non-parking lock state; and
   a connection detection sensor for determining a state of connection between the external power supply and the connector,
   said processor controlling said parking lock state and said non-parking lock state,
   wherein when said processor receives a signal from the connection detection sensor that said external power supply is disconnected from said connector while said vehicle is in said parking lock state, and said momentary movable portion has been operated before disconnection of said external power supply from said connector, said processor maintains the parking lock state, and when said momentary movable portion is operated after said external power supply is disconnected from said connector, said processor cancels the parking lock state.

2. The control device for a vehicle according to claim 1, wherein
   said processor determines, when said external power supply is disconnected from said connector while said vehicle is in said parking lock state, whether said movable portion has been operated from said home position to a prescribed shift position different from said home position after disconnection of said external power supply from said connector, and cancels the parking lock state when said movable portion has been operated from said home position to said prescribed shift position.

3. The control device for a vehicle according to claim 2, further comprising a storage unit for storing a return history, wherein said processor determines, when said external power supply is disconnected from said connector while said vehicle is in said parking lock state, whether there is said return history indicating detection of a fact that the position of said movable portion has returned to said home position after disconnection of said external power supply from said connector, maintains said parking lock state when there is no said return history, and cancels said parking lock state when there is said return history and when said movable portion has been operated from said home position to said prescribed shift position.

4. The control device for a vehicle according to claim 3, wherein said processor has said return history stored when it is detected that the position of said movable portion has returned to said home position while said external power supply is not connected to said connector, erases said return history when said external power supply is connected to said connector, maintains the parking lock state when said external power supply is disconnected from said connector while said vehicle is in said parking lock state and when said return history is not stored, and cancels the parking lock state when said return history is stored and when said movable portion has been operated from said home position to said prescribed shift position.

5. The control device for a vehicle according to claim 4, wherein said processor permits charging from said external power supply and maintains said parking lock state while said external power supply is connected to said connector and said vehicle is in said parking lock state.

6. The control device for a vehicle according to claim 1, wherein said plurality of shift positions include a forward drive position in addition to said home position, and said forward drive position is provided at a position lower than said home position.

* * * * *